(12) United States Patent
Newton (10) Patent No.: US 8,717,355 B2
(45) Date of Patent: May 6, 2014

(54) IMAGE PROCESSOR FOR OVERLAYING A GRAPHICS OBJECT

(75) Inventor: Philip Steven Newton, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 776 days.

(21) Appl. No.: 12/809,078

(22) PCT Filed: Dec. 19, 2008

(86) PCT No.: PCT/IB2008/055450
§ 371 (c)(1),
(2), (4) Date: Jun. 18, 2010

(87) PCT Pub. No.: WO2009/083885
PCT Pub. Date: Jul. 9, 2009

(65) Prior Publication Data
US 2010/0271466 A1    Oct. 28, 2010

(30) Foreign Application Priority Data

Dec. 26, 2007 (EP) .................................. 07301742

(51) Int. Cl.
*H04N 13/00* (2006.01)
*G06T 15/40* (2011.01)
*G06T 15/00* (2011.01)

(52) U.S. Cl.
USPC .............................. 345/421; 348/43; 382/154

(58) Field of Classification Search
USPC ............................... 345/421; 348/43; 382/154
See application file for complete search history.

(56) References Cited

U.S. PATENT DOCUMENTS

| 6,057,847 | A * | 5/2000 | Jenkins ......................... 345/422 |
| 6,850,234 | B2 * | 2/2005 | Zviaguina et al. ............ 345/421 |
| 2006/0294543 | A1 | 12/2006 | Yahata et al. |
| 2010/0158351 | A1 * | 6/2010 | De Jong et al. ............... 382/154 |
| 2011/0032338 | A1 * | 2/2011 | Raveendran et al. ........... 348/51 |
| 2012/0212579 | A1 * | 8/2012 | Frojdh et al. .................... 348/43 |
| 2013/0162773 | A1 * | 6/2013 | Tian et al. ....................... 348/43 |

FOREIGN PATENT DOCUMENTS

| EP | 2515539 A1 * | 10/2012 |
| WO | 9747141 A2 | 12/1997 |
| WO | 03100727 A2 | 12/2003 |
| WO | 2005004478 A1 | 1/2005 |

(Continued)

OTHER PUBLICATIONS

Axis Communications AB, Axis H.264 SEI Header—User Data (2009).*

(Continued)

*Primary Examiner* — Dave Czekaj
*Assistant Examiner* — David N Werner (57) ABSTRACT

An image processor processes an assembly of data that defines an elementary image and a graphics object. The assembly of data includes composition data that defines a given appearance of the graphics object in an output image, where the graphics object overlays a portion of the elementary image. The image processor includes an occlusion analyzer for establishing an occlusion indication based on the composition data. The occlusion indication specifies an area in the elementary image that the graphics object will occlude in the output image, but which may be de-occluded in a stereoscopic rendering of the output image. An occlusion data generator composes an occlusion image based on the occlusion indication and the elementary image. The occlusion image represents a portion of the elementary image that corresponds with the area specified by the occlusion indication.

20 Claims, 4 Drawing Sheets

(56) References Cited

FOREIGN PATENT DOCUMENTS

| WO | 2005006747 | A1 | 1/2005 |
| WO | 2006095300 | A2 | 9/2006 |
| WO | 2006136989 | A1 | 12/2006 |

OTHER PUBLICATIONS

J. Shade et al, "Layered Depth Images", Proceedings of Siggraph 98: 25th International Conference on Computer Graphics and Interactive Techniques, Jul. 1998, p. 231-242.

H. Kim, "Hierarchical Depth Estimation for Image Synthesis in Mixed Reality", SPIE, Electronic Imaging, Jan. 2003, pp. 548-552.

J.D. Foely et al, "Computer Graphics Principles and Practice", Reading, 15:Visible-Surface Determination, Jan. 1996, pp. 649-720.

M.W. Wloka et al, "Resovling Occlusion in Augmented Reality", Proceedings 1995 Symposium on Interactive 3D Graphics, Apr. 9, 1995, pp. 5-12.

T. Kanade et al, "A Stereo Machine for Video-Rate Dense Depth Mapping and Its New Applications", Proceedings 1996 IEEE Computer Society Conference on Computer Vision and Pattern Recognition, Jun. 18, 1996, pp. 196-202.

\* cited by examiner

FIG. 5

IMAGE PROCESSOR FOR OVERLAYING A GRAPHICS OBJECT

FIELD OF THE INVENTION

The invention mainly relates to an image processor that can overlay a graphics object on an elementary image. The image processor may be in the form of, for example, a Blu-ray Disc playback device that is capable of providing stereoscopic video output data. Other aspects of the invention relate to a stereoscopic video rendering system, a method of processing an assembly of data that defines an elementary image and a graphics object, and a computer program product for a programmable processor.

BACKGROUND ART

An enhanced video experience can be obtained by overlaying a graphics object on an elementary image, or on a sequence of elementary images that constitute a video. Adding subtitles is a basic example in which the graphics objects is in the form of text. In more advanced applications, one or more graphics object may represent a drawing, which may have a conceptual relationship with the elementary image. It is also possible to add an animation to a video based on one or more graphics objects.

A standard has been developed for so-called Blu-ray Disc applications, which are capable of providing enhanced video experiences. The standard specifies so-called graphics object segments, which provides a basic representation of a graphics object in an encoded form. The standard further specifies so-called composition segments. A composition segment describes a given appearance of a graphics object to which the composition segment relates. The basic representation of the graphics object needs to be processed in order to achieve this given appearance. This processing may include operations, such as, for example, cropping, positioning, color mapping. A graphics controller typically defines these operations on the basis of the composition segment concerned. The graphics object that results from processing the basic representation thereof is typically placed in a so-called graphics plane. This graphics plane is then overlaid on a video plane, which corresponds with an image of a video. The video plane can thus be regarded as an elementary image onto which the graphics object is overlaid.

United States patent application published under number US 2006/0294543 describes background art techniques according to which a reproduction apparatus separately decodes a video stream and a graphics stream and overlays resulting video and graphics to produce a reproduction image. The graphics stream is an arrangement of so-called PES packets, and these packets can be classified into two types: PES packets carrying control information and PES packets carrying graphics data, which represents graphics. One pair of control information and graphics data produces one graphics display. The reproduction apparatus reads the control information and the graphics data in sequence, decodes the control information, and also decodes the graphics data to generate uncompressed graphics. The reproduction apparatus displays the uncompressed graphics with a desired presentation timing, according to a decoding result of the control information

SUMMARY OF THE INVENTION

It is then an object of the invention to provide a solution that allows satisfactory stereoscopic image rendering, at relatively low cost, of an image in which a graphics object overlays an elementary image. The independent claims define various aspects of the invention. The dependent claims define additional features for implementing the invention to advantage.

The invention takes the following points into consideration. An occlusion problem may occur when an image, which has been obtained by overlaying a graphics object onto an elementary image, is rendered in a stereoscopic fashion. In order to render the image in a stereoscopic fashion, depth information is required. This depth information, which indicates respective distances that respective objects have with respect to a virtual observer, can be used by a processor to generate multiple views. Each view corresponds with a particular viewing position, which slightly differs from other viewing positions. The graphics object will occlude a part of the elementary image. At least a portion of the part that is occluded may be de-occluded in one or more views, which are generated for stereoscopic rendering. This poses a problem in case the processor needs to generate multiple views on the basis of the aforementioned image. Information is missing.

A basic solution to the occlusion problem is as follows. The processor that generates multiple views for stereoscopic rendering is provided with the elementary image in its entirety, rather than the image in which the graphics object overlays the elementary image. That is, the processor receives the elementary image and the graphics object, as well as the relevant depth information. Accordingly, the processor has all the necessary information for correctly generating the multiple views.

However, the aforementioned basic solution may be relatively expensive to implement. The processor concerned preferably forms part of a stereoscopic display device, which can be coupled to numerous different types of video devices. This implies that a connection between the stereoscopic display device and a video device couple thereto, needs to convey the elementary image as well as the graphics object and other visual information, if any, which needs to be rendered. The connection will need to have relatively large bandwidth in order to convey all this information. Connections of the type concerned have been standardized. A standardized connection has a given maximum bandwidth. In case a bandwidth is required that exceeds the given maximum bandwidth, multiple connections are needed. This is relatively expensive and may also be cumbersome.

The occlusion problem may also be solved by so-called hole-filling techniques. A hole filling technique may be based on extrapolation: available visual information in an image is used for reconstructing missing visual information in the image. As another example, the part of the elementary image that the graphics object occludes, may be reconstructed on the basis of preceding images or subsequent images, or both, of the same video. Video generally comprises objects that are moving. Accordingly, the part of the elementary image that is occluded in a given image may be at least partially visible in an image that precedes the given image, or that follows the given image, or both. However, such hole-filling techniques typically require complex processing and are therefore expensive to implement.

In accordance with the invention, an image processor processes an assembly of data that defines an elementary image and a graphics object. The assembly of data comprises composition data that defines a given appearance of the graphics object in an output image, wherein the graphics object overlays a portion of the elementary image. The image processor comprises an occlusion analyzer for establishing an occlusion indication on the basis of the composition data. The occlusion indication specifies an area in the elementary image that the graphics object will occlude in the output image, but that may be de-occluded in a stereoscopic rendering of the output image. An occlusion data generator composes an occlusion image on the basis of the occlusion indication and the elementary image. The occlusion image represents a portion of the elementary image that corresponds with the area specified by the occlusion indication.

For example, in a Blu-ray Disc application, the composition data is available in the form of the composition segments mentioned hereinbefore. The composition segments allow determining where occlusion will occur. There is no need to analyze the graphics object concerned, which, moreover, first needs to be generated for that purpose. Relatively few operations, which may be relatively simple, are sufficient to provide an indication of where occlusion will occur. This indication can be used to identify complementary visual information in an elementary image that will allow a processor to generate multiple views without having to use any hole filling techniques. This complementary visual information can be sent to a display device along with the image concerned, wherein the graphics object overlays the elementary image. The complementary visual information will typically represent only a relatively small portion of the elementary image. This relaxes requirements on bandwidth of a connection between a display device and a video device in which elementary images are overlaid with graphics objects. For those reasons, the invention allows satisfactory stereoscopic rendering, at relatively low cost, of an image in which a graphics object overlays an elementary image.

An implementation of the invention advantageously comprises one or more of the following additional features, which are described in separate paragraphs corresponding with individual dependent claims. Each of these additional features contributes to achieving a satisfactory stereoscopic image rendering at relatively low cost.

The occlusion analyzer preferably provides the occlusion indication as an adaptation of the composition data. The image processor then comprises a graphics controller that processes the composition data and the occlusion indication in a similar fashion. The processing of the occlusion indication provides occlusion data generation control parameters for the occlusion data generator. Accordingly, the graphics controller is used for two purposes: graphics composition and occlusion data generation. This allows very efficient and, therefore, cost-effective implementations, which can be based on an existing graphics controller in, for example, Blu-ray Disc applications.

The occlusion analyzer preferably defines the area in the elementary image that the graphics object will occlude, as a fixed-size border portion of the graphics object.

The occlusion analyzer can also specify the area in the elementary image that the graphics object will occlude, as a variable-size border portion of the graphics object. The border portion has a size that depends on a depth indication, which indicates a difference in depth between the graphics object and the area that the graphics object will occlude.

The occlusion data generator preferably comprises an occlusion depth map composer, which composes an occlusion depth map on the basis of the occlusion indication and a depth map that is associated with the elementary image. The occlusion depth map represents a portion of the depth map that corresponds with the area defined by the occlusion indication.

The image processor may comprise a back-end module for including the occlusion image in the output image.

The backend module can embed a header in the output image. The header can indicate an area in the output image where the occlusion image has been included.

A detailed description, with reference to drawings, illustrates the invention summarized hereinbefore as well as the additional features.

DETAILED DESCRIPTION

Figure 1:
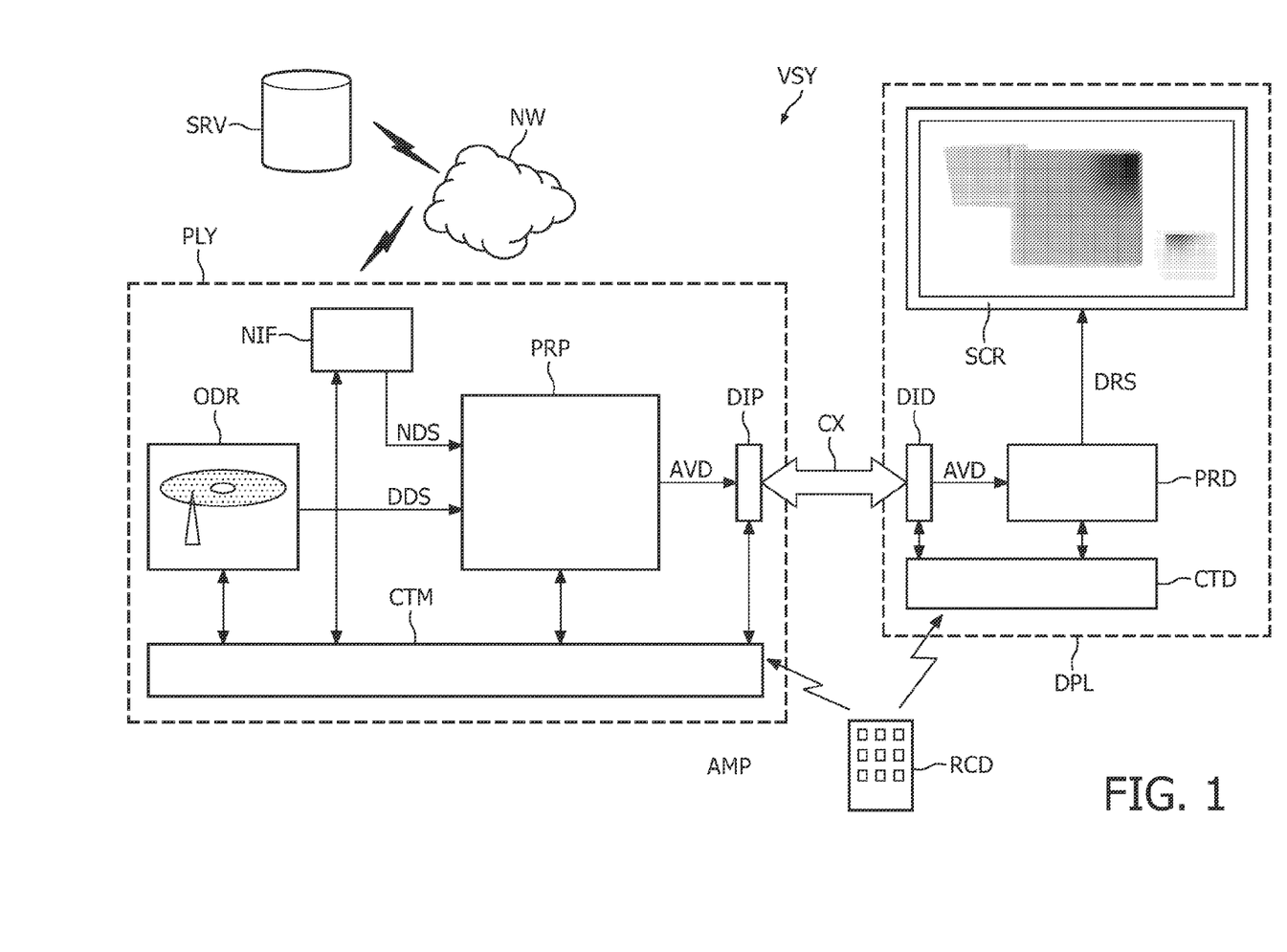
FIG. 1 is a block diagram that illustrates a stereoscopic video system.

FIG. 9 illustrates a stereoscopic video system VSY that comprises a playback device PLY and a display device DPL. The playback device PLY may be, for example, a Blu-ray Disc player. The playback device PLY communicates with the display device DPL via a connection that is standardized, such as, for example, a Digital Visual Interface (DVI) or a High-Definition Multimedia Interface (HDMI), both not shown. The display device DPL may be of the auto-stereoscopic type. The stereoscopic video system VSY may further comprise a remote control device RCD that allows a user to control the playback device PLY as well as the display device DPL. For example, the user may cause the stereoscopic video system VSY to display a menu from which he or she selects an item by means of the remote control device RCD.

The playback device PLY comprises an optical disk reader ODR, a playback processor PRP, a display interface DIP, and a main controller CTM. The playback device PLY may further comprise a network interface NIF for communicating with a remote server SRV via a network NW. The playback processor PRP may be in the form of a programmable processor that has been loaded with a suitable software program. The same applies to the main controller CTM and at least a portion of the display interface DIP and the network interface NIF. Various functional entities, such as, for example, the playback processor PRP and the main controller CTM, may be implemented by means of a single programmable processor.

The display device DPL comprises a display interface DID, a display processor PRD, a display controller CTD, and a screen SCR that allows stereoscopic video rendering. The display processor PRD may be in the form of a programmable processor that has been loaded with a suitable software program. The same applies to the display controller CTD and at least a portion of the display interface DID.

The screen SCR may comprise a liquid crystal (LCD) display and a sheet of lenticular lenses. The lenticular lenses diffract light that emanates from the display such that the left eye and the right eye of a viewer receive light from different pixels. Accordingly, a view that is displayed by means of a set of pixels can be directed towards the left eye. Another view that is simultaneously displayed by means of a different set of pixels can be directed towards the right eye. Such an auto-stereoscopic screen allows a user to see stereo video, which provides a three-dimensional viewing experience, without having to wear particular glasses. However, resolution is sacrificed to render multiple views. A stereo image may thus have a relatively modest resolution, such as, for example, 960 by 540 pixels.

The stereoscopic video system VSY basically operates as follows. Let it be assumed that a user has just inserted into the playback device PLY a Blu-ray Disc that comprises stereoscopic video data. In an initial phase, the main controller CTM causes the optical disk reader ODR to read application data that is stored on the optical disk. The main controller CTM uses the application data to present a menu to the user by means of the display device DPL. The menu may propose, for example, a playback of a given title in a basic stereoscopic mode, without any graphics animation, or in an enhanced stereoscopic mode, with graphics animations.

Let it be assumed that the user selects the enhanced stereoscopic mode, which is a particular rendering of multimedia content that is present on the optical disk. In response, the main controller CTM appropriately configures the playback processor PRP on the basis of one or more playback definitions, which are comprised in the application data and associated with the enhanced stereoscopic mode. The main controller CTM may carry out further operations so as to ensure the particular rendering that the user has selected.

Once the initial phase has been completed, the optical disk reader ODR provides a disk data stream DDS that comprises the multimedia content of interest. The playback processor PRP, which has appropriately been configured in the initial phase, processes the disk data stream DDS so as to obtain an audiovisual data stream AVD that corresponds with the particular rendering that the user has selected. The audiovisual data stream AVD comprises output images, which may be compositions of various different types of content, such as, for example, video and graphics. In addition, the playback processor PRP may include additional information in the audiovisual data stream AVD so as to assist the display device DPL in correctly interpreting this data stream. The audiovisual data stream AVD reaches the display processor PRD of the display device DPL via the aforementioned display interfaces DIP, DID, and the connection CX between said interfaces DIP, DID of the playback device PLY and the display device DPL respectively.

The display processor PRD processes the audiovisual data stream AVD so as to produce a driver signal DRS for the screen SCR. More specifically, the display processor PRD retrieves a sequence of visual images and a sequence of depth maps from the audiovisual data stream AVD. The visual images are two dimensional. A depth map is associated with a particular visual image and provides information about respective distances that respective objects in the visual image have with respect to a virtual observer. That is, the depth map provides depth information for respective areas in the visual image. The sequence of depth maps allows a stereoscopic rendering of the scene concerned, which may also be referred to as a three-dimensional rendering.

The depth maps may be in the form of a matrix of values, whereby each value is associated with a particular pixel, or a particular cluster of pixels, in a visual image. A pixel, or a cluster of pixels, typically represents a particular portion of a particular object. Accordingly, a value from the depth map that is associated with the pixel concerned, or the cluster of pixels concerned, represents the distance that the portion concerned of the object concerned has with respect to the virtual observer. There are various different fashions in which the value can express that distance. For example, the value may directly indicate the distance concerned. As another example, the value may indicate an amount of angular shift for the pixel concerned in a left eye view and a right eye view. Such values are commonly referred to as parallax values or disparity values.

A depth map may be represented as a black-and-white image, which is a matrix of grayscale values. A grayscale value may be expressed, for example, by means of 8 bits. In an ordinary notation, this means that the grayscale value is comprised in a range between 0 and 255. A grayscale value of 0 indicates a largest possible distance from the virtual observer. This corresponds with a darkest possible pixel in the black-and-white image that represents the depth map. Conversely, a grayscale value of 255 indicates a smallest possible distance from the virtual observer. This corresponds with a brightest possible pixel in the black-and-white image that represents the depth map.

Figure 2:
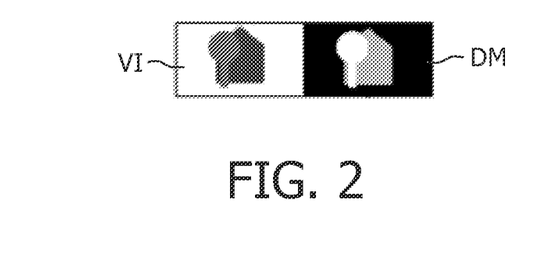
FIG. 2 is a pictorial diagram that illustrates a visual image and a depth map associated therewith, which occur in the stereoscopic video system.

FIG. 2 illustrates a visual image VI and a depth map DM associated therewith, which the display processor PRD may retrieve from the audiovisual data stream AVD. The visual image VI represents a house in front of which there is a tree. The house and the tree can also be identified in the depth map DM. More precisely, the tree has an outline that surrounds a white surface, which indicates that the tree is relatively close to a virtual observer. The house has an outline that surrounds a grayish surface, which indicates that the house is located further away from the virtual observer than the tree. A dark area in the depth map DM corresponds with a background in the visual image. Any background object is located relatively far away from the virtual observer.

Figure 3:
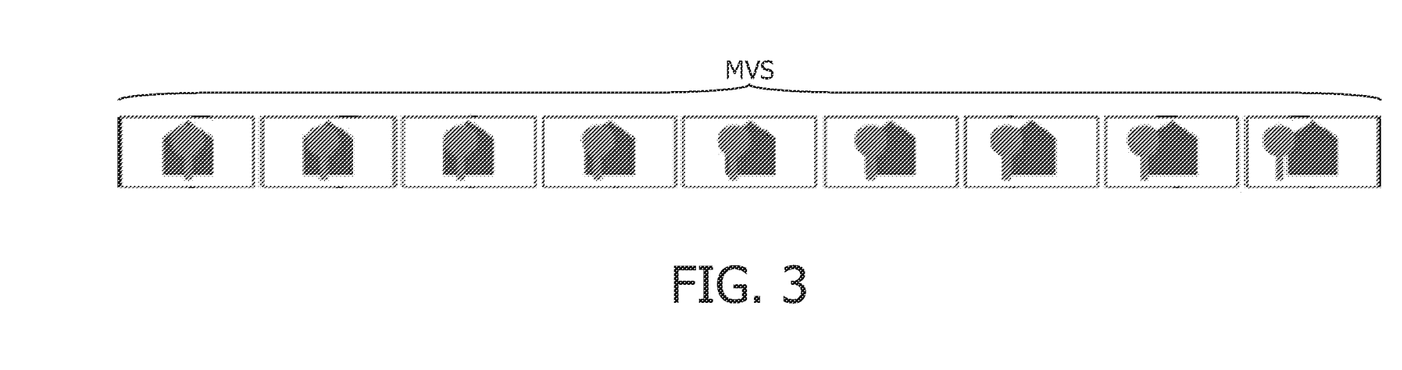
FIG. 3 is a pictorial diagram that illustrates nine different views, which are generated within the stereoscopic video system.

FIG. 3 illustrates a set of nine different views MVS, which the display processor PRD may generate on the basis of the visual image VI and the depth map DM illustrated in FIG. 2. Each view represents the house and the tree in front thereof seen from a particular viewing position. That is, there are nine viewing positions, which slightly differ. A slight change in the viewing position causes a relatively great displacement of the tree, due to the relatively small distance between the tree and the virtual observer. In contrast, the house moves to a relatively small extent throughout the views, because the house is located further away from the virtual observer. In general, the display processor PRD determines an appropriate displacement of an object between two different views on the basis of a depth map. The closer the object is to the virtual observer, the greater the displacement is. An object that is deeply located, as it were, in a visual image will undergo a relatively small displacement or may even remain at the same location. Accordingly, a three-dimensional experience can be created on the basis of the depth map.

The screen SCR may be of the auto-stereoscopic type, as mentioned hereinbefore, and comprise a sheet of lenticular lenses. In that case, the display processor PRD ensures that a particular view is applied to a particular set of pixels on the screen SCR that have a particular location with respect to the sheet of lenticular lenses. Accordingly, the display processor PRD ensures that each view is beamed, as it were, in an appropriate direction. This allows a stereoscopic viewing experience that does not require any particular glasses, which a viewer should have to wear.

In the visual image VI represented in FIG. 2, the tree occludes a portion of the house. In the set of nine views MVS represented in FIG. 3, the portion of the house that is occluded becomes partially visible, except for a middle view, which corresponds with the visual image represented in FIG. 2. That is, a view that is generated for stereoscopic rendering may comprise portions that are not present in the visual image on which the stereoscopic rendering is based. It is possible to approximately reconstruct these missing portions on the basis of information that is present in the visual image by means of so-called hole-filling techniques. However, hole-filling techniques may fall short in case an object that is partially occluded is relatively distant from a virtual observer.

Figure 4:
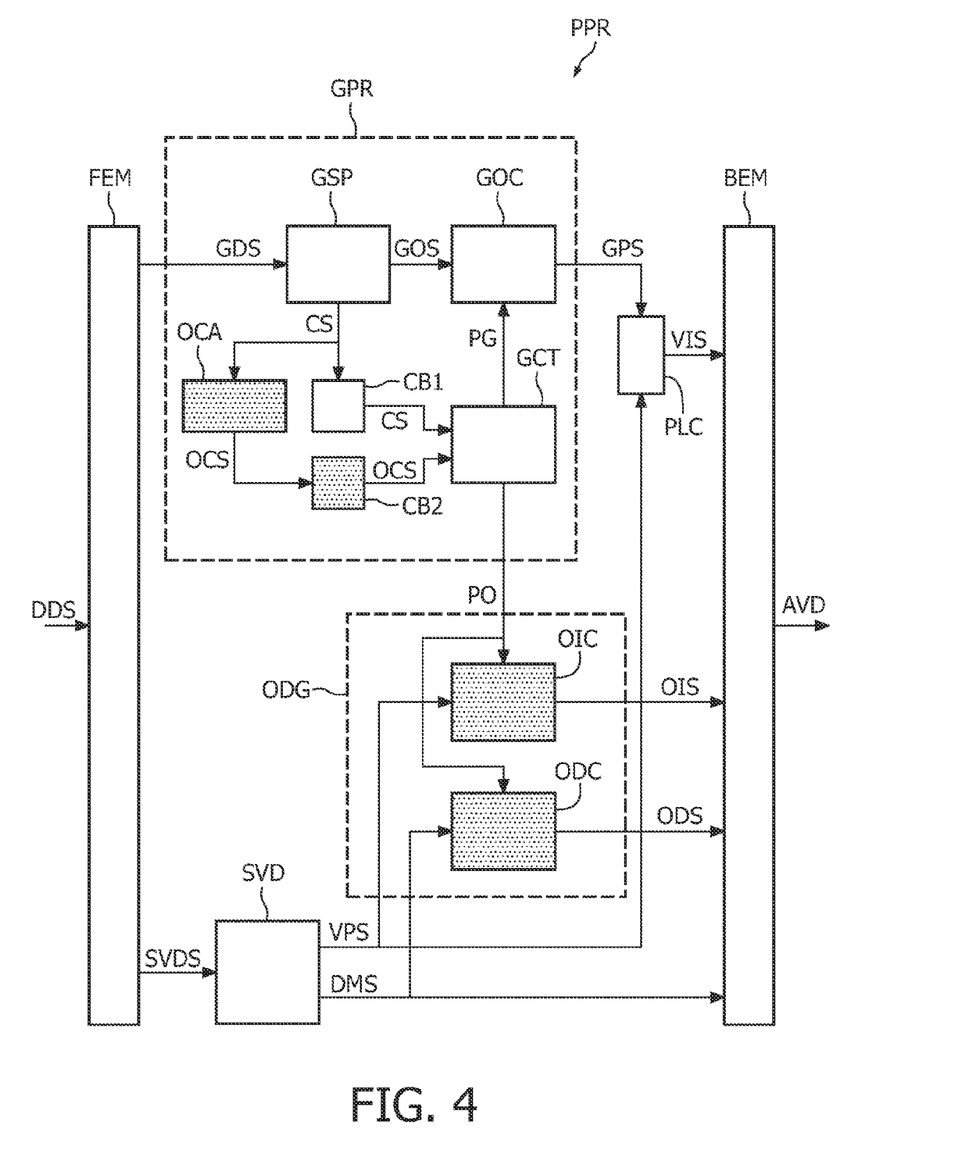
FIG. 4 is a block diagram that illustrates a playback processor, which forms part of the stereoscopic video system.

FIG. 4 illustrates the playback processor PRP, which can operate in accordance with the Blu-ray Disc standard. The playback processor PRP comprises various main functional entities: a front-end module FEM, a graphics processor GPR, a stereoscopic video decoder SVD, an occlusion data generator ODG, a plane combiner PLC, and a back-end module BEM. The playback processor PRP may further comprise an internal controller, which cooperates with the main controller CTM illustrated in FIG. 1. The graphics processor GPR may be in the form of a programmable processor that has been loaded with a suitable software program. The same applies to the other functional entities. All functional entities may be combined on a single processor that has been suitably programmed.

The graphics processor GPR comprises various functional entities: a graphics stream processor GSP, a graphics object composer GOC, a composition buffer CB1, and a graphics controller GCT. These functional entities, or rather equivalents thereof, can be found in a conventional Blu-ray disk playback device. The graphics processor GPR illustrated in FIG. 4 further comprises the following functional entities: an occlusion analyzer OCA, and a supplementary composition buffer CB2. These functional entities can be regarded as being added to those already present in a conventional Blu-ray Disc graphics processor. The occlusion data generator ODG comprises two functional entities: an occlusion image composer OIC and an occlusion depth map composer ODC.

Any of the aforementioned functional entities may be implemented by means of a software program that is loaded into a programmable processor. In such a software-based implementation, the software program causes the programmable processor to carry out specific operations that belong to the functional entity concerned. For example, a single programmable processor that is suitably programmed may implement the graphics processor GPR as well as the occlusion data generator ODG. It should be noted that any functional entity can equally be considered as a processing step, or a series of processing steps. For example, the occlusion analyzer OCA can represent an occlusion analysis step. The functional entities are merely described as if these were physical entities, rather than steps, for reasons of ease of description.

The playback processor PRP basically operates as follows. The front-end module FEM processes the disk data stream DDS from the optical disk reader ODR so as to retrieve various different data streams, which are present in the disk data stream DDS in a multiplexed form. To that end, the front-end module FEM carries out various operations, which may include error decoding and demultiplexing. Accordingly, the front-end module FEM retrieves a graphics data stream GDS, which complies with the Blu-ray Disc standard, and a stereoscopic video data stream SVDS. The stereoscopic video data stream SVDS may be a multiplex of data streams comprising, for example, a data stream that conveys visual information and another data stream that conveys depth information.

The graphics data stream GDS comprises so-called graphics object segment and so-called composition segments. The graphics object segments carry graphic objects in an encoded form. in the Blu-ray Disc standard, run-length encoding is typically used for graphic objects. The composition segments comprise information on how the graphics object should be processed in a playback device PLY for the purpose of rendering. That is, the composition segments define how the graphics object should appear on a so-called graphics plane. This graphics processing for the purpose of rendering may include operations as, for example, cropping, object placement, and color mapping. Accordingly, the composition segments constitute metadata for the graphics object segments. Metadata is data that provides information about data, which may be used to interpret or handle, or both, the last mentioned data. Further information regarding graphics in Blu-ray disk can be found in the international applications published under number WO 2005/006747 and WO 2005/004478.

The graphics stream processor GSP retrieves the graphics object segments from the graphics data stream GDS and decodes these graphics object segments. Accordingly, the graphics stream processor GSP produces decoded graphics objects, which are typically temporarily stored in a buffer. The graphics object composer GOC receives a decoded graphics object from this buffer at an appropriate instant, which is typically defined by a so-called timestamp. The graphics stream processor GSP thus applies a sequence of graphics objects GOS to the graphics object composer GOC, as illustrated in FIG. 4.

The graphics stream processor GSP further retrieves composition segments CS that are present in the graphics data stream GDS. These composition segments CS are temporarily stored in the composition buffer CB1 illustrated in FIG. 4. The composition segments CS are further sent to the occlusion analyzer OCA.

The graphics controller GCT fetches composition segments CS from the composition buffer CB1 in accordance with a timing scheme that is defined by timestamps. Let it be assumed that the graphics object composer GOC is about to receive a particular decoded graphics object. A particular composition segment is associated with this decoded graphics object. The graphics controller GCT fetches this composition segment from the composition buffer CB1 before the graphics object composer GOC starts processing the decoded graphics object concerned. The graphics controller GCT interprets the composition segment concerned so as to establish a set of graphics-composition control parameters PG for the graphics object composer GOC.

The graphics object composer GOC processes the decoded graphics object in accordance with the set of graphics-composition control parameters PG. The graphics object composer GOC may carry out various different operations, such as, for example, cropping or scaling, object placement, and color mapping on the basis of a color lookup table. These operations cause the decoded graphics object to have a given appearance on a graphics plane. The composition segment, which the graphics controller GCT has translated into a set of graphics-composition control parameters PG, defines this appearance. A graphics plane can be regarded as an elementary image, which may be combined with other elementary images, so as to obtain an output image for display. This will be described in greater detail hereinafter.

The stereoscopic video decoder SVD decodes the stereoscopic video data stream SVDS so as to obtain a sequence of video planes VPS and a sequence of depth maps DMS. A video plane can be regarded as an elementary image, which belongs to a video that has been recorded on the optical disk. The sequence of video planes VPS thus represents the video concerned. A depth map is associated with a particular video plane and provides depth information about objects that are present in the video plane, as described hereinbefore. That is, a value in a depth map relates to a particular area in the video plane concerned and indicates a distance that this particular area has with respect to a virtual observer. The area concerned may comprise, for example, a single pixel or a cluster of pixels.

The plane combiner PLC receives the sequence of video planes VPS from the stereoscopic video decoder SVD and a sequence of graphics planes GPS from the graphics processor GPR. A graphics plane is associated with a particular video plane. The plane combiner PLC combines the graphics plane and the video plane associated therewith. The graphics plane is typically overlaid on the video plane so that a graphics object has a foreground position. The foreground position may be specified by means of a depth indication, which is associated with the graphics object, and which indicates a distance with respect to a virtual observer. Alternatively, the graphics object may have a fixed depth, which is predefined. Areas in the graphics plane that do not comprise any object can be considered as being transparent. Accordingly, a visual image is obtained, which corresponds with an image of the video concerned with one or more graphics objects being overlaid on this image. The plane combiner PLC thus provides a sequence of visual images VIS in response to the sequence of video planes VPS and the sequence of graphics planes GPS.

A graphics object that has a foreground position in a visual image will typically occlude one or more objects that are present in the video plane on which the visual images based. For example, the house illustrated in FIG. 2 may be an object that is comprised in a video plane. The tree illustrated in the same FIG. may be a graphics object that is comprised in a graphics plane, which is overlaid on the video plane. The tree occludes a portion of the house, which may give rise to artifacts in a stereoscopic rendering is explained hereinbefore with reference to FIGS. 2 and 3.

Stereoscopic rendering artifacts potentially have a relatively high degree of visibility, and thus a relatively high degree of nuisance, when a graphics object occludes a portion of a video plane. This is because the graphics object will typically be relatively close to a virtual observer, whereas one or more occluded objects in the video plane will typically be relatively far away from the virtual observer. That is, there will be relatively great difference in depth. In such cases, it will generally be difficult to mitigate the aforementioned artifacts by means of hole-filling techniques mentioned hereinbefore. An elegant technique of preventing artifacts, which involves the occlusion analyzer OCA, the supplementary composition buffer CB2, and the occlusion data generator ODG, is presented hereinafter.

The occlusion analyzer OCA generates occlusion composition segments OCS on the basis of the composition segments CS, which are present in the graphics data stream GDS. As explained hereinbefore, a composition segment applies to a particular graphics object. The composition segment indicates an area that the graphics object will occupy in a visual image. Let it be assumed that the graphics object has a foreground position, which will typically be the case. The area occupied by the graphics object then constitutes an area of occlusion. The composition segment indicates this area of occlusion. The occlusion analyzer OCA uses this information for generating an occlusion composition segment, which relates to a visual image in which the graphics object concerned will appear. Optionally, the occlusion analyzer OCA may also use depth information, if available, for generating an occlusion composition segment. The occlusion composition segments OCS are temporarily stored in the supplementary composition buffer CB2.

An occlusion composition segment can be regarded as an adapted version of a composition segment. The occlusion composition segment indicates an occlusion area in a visual image. The occlusion area may correspond with the area that the graphics object concerned occupies. The occlusion area may also correspond with a border portion of the area that the graphics object concerned occupies. Conceptually, the border portion may be established as follows. A cutter is placed, as it were, within the area concerned at a given distance from an outline of the graphics object. The cutter follows the outline while maintaining the given distance. The border portion is comprised between the outline of the graphics object and a path that the cutter follows. However, different techniques may be used to establish a border portion. For example, a border portion may be defined in terms of fixed-size blocks, which corresponds to a rounding off of an actual border portion that is required to compensate for occlusion.

The border portion may have a fixed size. That is, the given distance at which the aforementioned cutter is placed may be fixed, or the number of blocks that define a border portion may be fixed. The border portion may also have a size that depends on depth information, which indicates a difference in depth between the graphics object concerned and one or more occluded objects. The greater this difference in depth is, the larger the size of the border portion should be. This last approach requires more computational effort compared with the approach where the border portion has a fixed size.

In practice, a border portion of fixed size will generally provide satisfactory results. This is because stereoscopic displays can generally reproduce only a relatively modest amount of depth. Moreover, a viewer can typically experience only a relatively modest amount of depth in a comfortable fashion. Stereoscopic rendering with relatively large depth variations may give the viewer a headache. The border portion may thus be given a fixed size that corresponds with a maximum depth variation, which is defined by display technology or human physiology, or both.

The graphics controller GCT fetches the occlusion composition segments OCS, which are temporarily stored in the supplementary composition buffer CB2, in accordance with the timing scheme that is applicable. For example, the graphics controller GCT may apply the following scheme for each graphics object. The graphics controller GCT first fetches and processes the composition segment that belongs to the graphics object concerned so as to apply a set of graphics-composition control parameters PG to the graphics object composer GOC. The graphics controller GCT subsequently fetches the occlusion composition segment that the occlusion analyzer OCA has generated on the basis of the composition segment concerned. The graphics controller GCT processes the occlusion composition segment in a fashion similar to that in which the composition segment has been processed. Accordingly, the graphics controller GCT establishes a set of occlusion data generation control parameters PO. The set of occlusion data generation control parameters PO relate to a particular visual image, namely the visual image in which the graphics object concerned will appear.

The occlusion data generator ODG receives the set of occlusion data generation control parameters PO. The set of occlusion data generation control parameters PO relates to a particular video plane in the sequence of video planes VPS, namely the video plane that will be used to form the visual image in which the graphics object concerned will appear. The set of occlusion data generation control parameters PO further relate to a particular depth map, namely the depth map that is associated with the video plane concerned. The occlusion image composer OIC can obtain the video plane concerned from the stereoscopic video decoder SVD. A buffer may be used to temporarily store the video plane concerned.

In a similar fashion, the occlusion depth map composer ODC can obtain the depth map concerned from the stereoscopic video decoder SVD.

The occlusion image composer OIC forms an occlusion image on the basis of the video plane of interest and the set of occlusion data generation control parameters PO, which the graphics controller GCT provides. The occlusion image comprises a selected portion of the video plane of interest. The selected portion corresponds with the occlusion area that the occlusion composition segment of interest indicates. As mentioned hereinbefore, the occlusion area may correspond with a border portion of the area that the graphics object concerned occupies in the visual image concerned. That is, this border portion may constitute the selected portion of the video plane of interest. The occlusion image composer OIC may cut, as it were, the selected portion from the video plane of interest and paste the selected portion in an empty image so as to obtain the occlusion image.

In a similar fashion, the occlusion depth map composer ODC forms an occlusion depth map on the basis of the depth map of interest and the set of occlusion data generation control parameters PO. The occlusion depth image comprises a selected portion of the depth map, which corresponds to the selected portion of the video plane. The occlusion depth map composer ODC may cut, as it were, the selected portion from the depth map of interest and paste the selected portion in an empty depth map so as to obtain the occlusion depth map. The occlusion composition segment and the set of occlusion data generation control parameters PO derived therefrom, may conceptually be regarded as a stencil that defines a particular portion of the video plane concerned and the depth map concerned, which particular portion constitutes the occlusion image and the occlusion depth map, respectively.

The occlusion data generator ODG provides a sequence of occlusion images OIS and a sequence of occlusion depth maps ODS. These sequences may assist a display device DPL in providing a stereoscopic viewing experience that is artifact free, which can be understood, for example, on the basis of FIGS. 2 and 3. An occlusion image comprises portions that are missing in a visual image, but which may be required for generating an appropriate set of different views for stereoscopic rendering. An occlusion image preferably comprises only a relevant border portion of an occluded area in the visual image, as explained hereinbefore. An occlusion depth map provides depth information concerning missing portions, which are represented in the occlusion image associated therewith.

The back-end module BEM provides the audiovisual data stream AVD on the basis of the sequence of visual images VIS, the sequence of depth maps DMS, the sequence of occlusion images OIS, and the sequence of occlusion depth maps ODS. The audiovisual data stream AVD comprises a sequence of output images that are transmitted to the display device DPL via the connection CX illustrated in FIG. 1. An output image comprises a visual image, a depth map, an occlusion image, and a depth occlusion image. There are numerous different ways in which the output image may convey visual information, at information, and occlusion information.

Figure 5:
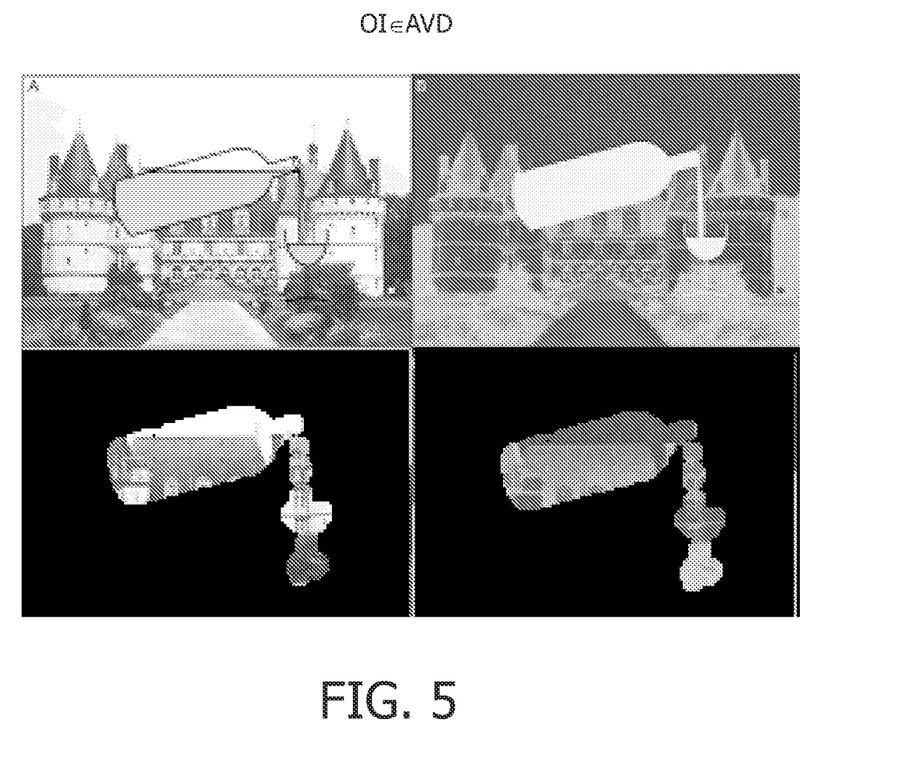
FIG. 5 is a pictorial diagram that illustrates an output image, which the playback processor can generate for transmission to a display device.

FIG. 5 illustrates an output image OI within the audiovisual data stream AVD. The output image OI is a mosaic image that has four quadrants: an upper left quadrant, an upper right quadrant, a lower left quadrant, and a lower right quadrant. The upper left quadrant comprises a visual image, which is a combination of a video plane and a graphics plane. The video plane represents a castle. The graphics plane represents a bottle that is filling a glass. The bottle and the glass may be individual graphics objects or may be represented by a single graphics object. In any case, the graphics plane has been overlaid over the video plane, so that the bottle that is filling the glass occludes a portion of the castle.

The upper right quadrant comprises a depth map. The depth map comprises a white area that corresponds with the bottle that is filling the glass. This white area indicates that the aforementioned objects are relatively close to a virtual observer. The rest of the depth map has a grayish, dark appearance, which indicates that objects in the video plane, such as, the castle, are relatively far from the virtual observer.

The lower left quadrant comprises an occlusion image. For the sake of simplicity and clarity, the occlusion image substantially corresponds with a portion of the video plane that is occluded by the bottle that is filling the glass in the visual image. What matters is that the occlusion image comprises only a particular portion of the video plane instead of the video plane in its entirety. This saves bandwidth. Similar remarks apply to the lower right quadrant, which comprises an occlusion depth map. The occlusion depth map comprises only particular portion of the depth map, which provides depth information about occluded objects in the visual image.

It should be noted that the visual image has a resolution that is half of that of the output image in a horizontal and vertical direction. For example, the output image OI may be in form of, for example, a matrix of 1920 by 1080 pixels. That is, the output image OI may comprise 1080 lines of 1920 pixels each. In that case, the visual image comprises 540 lines of 960 pixels each. The visual image thus has a relatively low resolution. However, this need not be a problem because a stereoscopic display device may have a comparable low resolution. As explained hereinbefore, auto-stereoscopic display devices effectively sacrifice resolution in order to render multiple views size to achieve an impression of depth. There is no need for a visual image that has a resolution exceeding that of the stereoscopic display device DPL.

The back-end module BEM illustrated in FIG. 4 may embed a header in an output image. The header, which may be in the form of a sequence of bits or a sequence of bytes, provides an indication of where a particular type of information is present in an output image. For example, the header may indicate that the upper left quadrant comprises a depth map, that the left quadrant comprises an occlusion image, and that the lower right quadrant comprises an occlusion depth map. The header may provide further indications that may be useful for appropriately rendering the output image, or rather the visual image comprises therein.

The header may be embedded in the output image in the following manner. A set of pixels is designated as carriers of bits from the header. The set of pixels is preferably designated so that between any given pair of pixels that belong to the set, there is at least one pixel in the output image that does not belong to the set. In other words, it is prevented that two neighboring pixels in the output image serve as header bit carriers. For each pixel that forms part of the set, a given pixel component is assigned a value that corresponds with one or more bits from the header. Preferably, each bit of the given pixel component is assigned an identical value, which represents a particular bit from the header. Such redundancy makes the header more robust against changes in brightness, contrast settings, and noise.

CONCLUDING REMARKS

The detailed description hereinbefore with reference to the drawings is merely an illustration of the invention and the additional features, which are defined in the claims. The invention can be implemented in numerous different manners. In order to illustrate this, some alternatives are briefly indicated.

The invention may be applied to advantage in any type of product or method that involves stereoscopic image rendering. A stereoscopic rendering system that comprises an optical disk player, as illustrated in FIG. 5, is merely an example. The invention may equally be applied to advantage in, for example, a receiver that is arranged to receive and process a data stream in conformity with, for example, the Blu-ray Disc standard. Such a data stream may reach the receiver via a network, such as, for example, the Internet. A data carrier need not necessarily be in the form of an optical disk. For example, a writable memory that may be in the form of an integrated circuit can comprise a data assembly that has been obtained by encoding one more images in accordance with the invention. The invention does not require any particular type of stereoscopic display device. An auto-stereoscopic display, which was mentioned in the detailed description, is merely an example. The stereoscopic display device may also be of a type that requires a viewer to wear a pair of glasses: one of which passes a left-eye view, or a sequence thereof, to the left eye, the other glass passing a right-eye view, or a sequence thereof, to the right eye. Such a stereoscopic display device alternately displays left-eye views and right-eye views.

The invention may be applied to advantage in numerous different types of applications. The detailed description hereinbefore mentions Blu-ray Disc applications. However, the invention may also be applied in DVD applications (DVD is an acronym for Digital Versatile Disk). DVD applications support sub-pictures for overlay of graphics for animations, menu, and subtitles. These sub-pictures are run-length encoded bitmaps. A DVD player may decode these run-length encoded bitmaps and overlay the sub-pictures thus obtained over a video background. This overlaying is done according to information specified in so-called sub-picture control commands, which describe how a sub-picture should be overlaid. One sub-picture control command describes a rectangle that specifies an area on the video background onto which the sub-picture should be overlaid. This information is similar to the information comprised in the composition segments within Blu-ray Disc applications.

There are numerous different ways of making graphics data available to a reproduction device. In the example described with reference to FIG. 5, the graphics data has been recorded together with visual data on an optical disk. However, the playback device PLY may retrieve graphics data from the remote server SRV via the network NW and the network interface NIF. The playback processor PRP may thus receive graphics data in the form of a network data stream NDS from the network interface NIF. A user, who selects a stereoscopic rendering mode for content that is present on the optical disk, may trigger such a retrieval of graphics data that is associated with the content concerned. The application data, which is also present on the optical disk, may indicate a particular Internet address, or a set of such addresses, where the stereo-enabling data can be retrieved. The retrieval may be subject to a payment.

There are numerous different ways in which occlusion-related information can be transmitted to a display device. FIG. 5 illustrates an implementation in which occlusion-related information is included in an output image. That is, a single channel is used, in the form of the connection CX, for transmitting all relevant information to the display device DPL. In another implementation, occlusion-related information may be sent to a display device via a separate channel. Such a separate channel may have a relatively modest bandwidth because the occlusion-related information will typically require a modest amount of data. This is because, thanks to the invention, the occlusion-related information is limited to that what is actually needed for the purpose of artifact-free stereoscopic rendering. Any overhead can be avoided. Moreover, compression techniques may be used so that the occlusion-related information can be fitted, as it were, in an even smaller amount of data. There is an advantage to sending occlusion-related information via a separate channel, which may have relatively low bandwidth and which may therefore be relatively inexpensive thanks to the invention. The advantage is that a video-transmission channel can be fully used in terms of bandwidth, which allows high-resolution stereoscopic rendering of a video. In this respect, it should be noted that stereoscopic display devices are expected to provide higher resolutions in a near future.

In case occlusion-related information is included in an output image, there are numerous ways to do so. FIG. 5 illustrates an example in which the output image is effectively divided into four quadrants, each of which carries a different type of information. In another implementation, the occlusion-related information may be included in a set of upper lines and a set of lower lines. Compression techniques may be used for fitting occlusion-related information into a relatively small number of lines, or a relatively small area in an output image. The same applies to depth-related information. Moreover, information in an output image other than visual information, may be randomized, as it were. Randomization makes this other information less noticeable in case the output image is displayed "as is" due to an erroneous use.

There are numerous different ways in which a display processor can detect a particular format of an output image. A header in the output image is not required. For example, a display processor may be preprogrammed to interpret and process an output image in accordance with a particular format. In yet another implementation, the display processor may analyze an output image, or a series of output images, so as to identify one or more particular areas in which stereo-enabling data may be present. Such an automatic detection can be based on statistical analysis: there will be a discontinuity between an area that comprises visual data and an area that comprises stereo-enabling data. Moreover, the discontinuity will occur in each image.

Any of the examples illustrated in FIGS. 1 and 4 may be implemented in the form of a method. That is, any block that occurs in these figures can represent one or more particular steps of a method. For example, the block designated GSP in FIG. 4 represents a graphics stream processing step as well as a graphics stream processor. The block designated GCT in FIG. 1 represents a control step for a graphics composition as well as a graphics controller. The block designated OIC in FIG. 1 represents an occlusion image composition step as well as an occlusion image composer, and so on for each block in each of the aforementioned figures, which can be interpreted as flowcharts.

There are numerous ways of implementing functions by means of items of hardware or software, or both. In this respect, the drawings are very diagrammatic, each representing only one possible embodiment of the invention. Thus, although a drawing shows different functions as different blocks, this by no means excludes that a single item of hardware or software carries out several functions. Nor does it exclude that an assembly of items of hardware or software or both carry out a function. It should be noted that any of the functional entities illustrated in FIG. 2 may be implemented by means of software or hardware, or a combination of software and hardware. For example, any functional entity may be implemented by suitably programming a programmable processor, which is a software-based implementation, or in the form of a dedicated circuit, which is a hardware-based implementation. Hybrid implementations may involve one or more suitably programmed processors as well as one or more dedicated circuits.

The remarks made herein before demonstrate that the detailed description, with reference to the drawings, illustrates rather than limits the invention. There are numerous alternatives, which fall within the scope of the appended claims. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps.

The invention claimed is:

1. An image processor for processing an assembly of data that defines an elementary image and a graphics object, the assembly of data comprising composition data that defines a given appearance of the graphics object in an output image, wherein the graphics object overlays a portion of the elementary image, the image processor comprising:
   an occlusion analyzer for establishing an occlusion indication based on the composition data, the occlusion indication specifying an area in the elementary image that the graphics object will occlude in the output image and that may be de-occluded in a stereoscopic rendering of the output image;
   an occlusion data generator for composing an occlusion image based on the occlusion indication and the elementary image, the occlusion image representing a portion of the elementary image that corresponds with the area specified by the occlusion indication; and
   a back-end module for including the occlusion image in the output image,
   wherein the back-end module is configured to embed a header in the output image, the header indicating an area in the output image where the occlusion image has been included.

2. The image processor as claimed in claim 1, the occlusion analyzer being arranged to provide the occlusion indication as an adaptation of the composition data, the image processor comprising:
   a graphics controller for processing the composition data and the occlusion indication in a similar fashion, wherein the processing of the occlusion indication provides occlusion data generation control parameters for the occlusion data generator.

3. The image processor as claimed in claim 1, the occlusion analyzer being arranged to define the area in the elementary image that the graphics object will occlude, as a fixed-size border portion of the graphics object.

4. The image processor as claimed in claim 1, the occlusion analyzer being arranged to define the area in the elementary image that the graphics object will occlude, as a variable-size border portion of the graphics object, the border portion having a size that depends on a depth indication indicating a difference in depth between the graphics object and the area that the graphics object will occlude.

5. The image processor as claimed in claim 1, the occlusion data generator comprising an occlusion depth map composer for composing an occlusion depth map based on the occlusion indication and a depth map that is associated with the elementary image, the occlusion depth map representing a portion of the depth map that corresponds with the area defined by the occlusion indication.

6. The image processor as claimed in claim 1, arranged to operate in accordance with a Blu-ray Disc standard, wherein the assembly of data comprises at least one graphics object segment, which represents the graphics object, and at least one composition segment, which comprises the composition data.

7. A stereoscopic video rendering system comprising an image processor as claimed in claim 1, and a stereoscopic display device for displaying the output image that the image processor provides.

8. The image processor of claim 1, wherein the image processor is configured to output an image comprising a mosaic image that has four quadrants, and wherein the header indicates that an upper left quadrant of the four quadrants comprises a visual image, an upper right quadrant comprises a depth map, a lower left quadrant of the four quadrants comprises an occlusion image, and a lower right quadrant of the four quadrants comprises an occlusion depth map.

9. The image processor of claim 1, wherein the image processor is configured to output an image that comprises a visual image, a depth map, the occlusion image, and an occlusion depth map.

10. The image processor of claim 1, further comprising a processor configured to use the occlusion indication for identifying complementary visual information in the elementary image and generating multiple views of the elementary image, wherein the complementary visual information represent a relatively small portion of the elementary image for being overlaid on portions of the multiple views of the elementary image.

11. The image processor of claim 1, wherein the occlusion data generator comprises an occlusion image composer configured to cut a selected portion from a video plane of interest and paste the selected portion in an empty image so as to obtain the occlusion image.

12. The image processor of claim 11, wherein the occlusion data generator further comprises an occlusion depth map composer configured to compose an occlusion depth map based on the occlusion indication and a depth map that is associated with the elementary image, the occlusion depth map representing a portion of the depth map that corresponds with the area defined by the occlusion indication, wherein the occlusion depth map composer is further configured to cut a selected portion from the depth map of interest and paste the selected portion in an empty depth map so as to obtain the occlusion depth map.

13. A method of processing by an image processor an assembly of data that defines an elementary image and a graphics object, the assembly of data comprising composition data that defines a given appearance of the graphics object in an output image wherein the graphics object overlays a portion of the elementary image, the method comprising the acts of:
   establishing by an occlusion analyzer of the image processor an occlusion indication based on the composition data, the occlusion indication defining an area in the elementary image that the graphics object will occlude in the output image and which may be de-occluded in a stereoscopic rendering of the output image;
   composing by an occlusion data generator of the image processor an occlusion image based on the occlusion indication and the elementary image, the occlusion image representing a portion of the elementary image that corresponds with the area defined by the occlusion indication;

including by a back-end module of the image processor the occlusion image in the output image; and embedding by the back-end module a header in the output image, the header indicating an area in the output image where the occlusion image has been included.

14. The method of claim 13, wherein the image processor outputs an image that comprises a mosaic image that has four quadrants, and wherein the header indicates that an upper left quadrant of the four quadrants comprises a visual image, an upper right quadrant comprises a depth map, a lower left quadrant of the four quadrants comprises an occlusion image, and a lower right quadrant of the four quadrants comprises an occlusion depth map.

15. The method of claim 13, wherein the image processor outputs an image that comprises a visual image, a depth map, the occlusion image, and an occlusion depth map.

16. The method of claim 13, further comprising the act of using the occlusion indication for identifying complementary visual information in the elementary image and generating multiple views of the elementary image, wherein the complementary visual information represent a relatively small portion of the elementary image for being overlaid on portions of the multiple views of the elementary image.

17. The method of claim 13, further comprising the acts of:
cutting a selected portion from a video plane of interest; and
pasting the selected portion in an empty image so as to obtain the occlusion image.

18. The method of claim 17, further comprising the acts of:
composing an occlusion depth map based on the occlusion indication and a depth map that is associated with the elementary image, the occlusion depth map representing a portion of the depth map that corresponds with the area defined by the occlusion indication;
cutting a selected portion from the depth map of interest; and
pasting the selected portion in an empty depth map so as to obtain the occlusion depth map.

19. A non-transitory computer readable medium comprising a set of instructions, which when loaded into a programmable processor, causes the programmable processor to carry out the acts of:

establishing by an occlusion analyzer an occlusion indication based on composition data that defines a given appearance of a graphics object in an output image, wherein the graphics object overlays a portion of an elementary image, the occlusion indication defining an area in the elementary image that the graphics object will occlude in the output image and which may be de-occluded in a stereoscopic rendering of the output image;

composing by an occlusion data generator an occlusion image based on the occlusion indication and the elementary image, the occlusion image representing a portion of the elementary image that corresponds with the area defined by the occlusion indication;

including by a back-end module the occlusion image in the output image; and embedding by the back-end module a header in the output image, the header indicating an area in the output image where the occlusion image has been included.

20. The non-transitory computer readable medium of claim 19, comprising further instructions, which when loaded into the programmable processor, further causes the programmable processor to carry out the acts of:
cutting a selected portion from a video plane of interest;
pasting the selected portion in an empty image so as to obtain the occlusion image
composing an occlusion depth map based on the occlusion indication and a depth map that is associated with the elementary image, the occlusion depth map representing a portion of the depth map that corresponds with the area defined by the occlusion indication;
cutting a selected portion from the depth map of interest; and
pasting the selected portion in an empty depth map so as to obtain the occlusion depth map.

\* \* \* \* \*